UNITED STATES PATENT OFFICE.

GEORGE DEFREN, OF NEWTON, MASSACHUSETTS.

PRODUCT FOR BREWERS' USE.

1,235,882. Specification of Letters Patent. Patented Aug. 7, 1917.

No Drawing. Application filed March 27, 1917. Serial No. 157,771.

*To all whom it may concern:*

Be it known that I, GEORGE DEFREN, a citizen of the United States, and a resident of Newton, in the county of Middlesex and State of Massachusetts, have invented an Improvement in Products for Brewers' Use, of which the following description is a specification.

This invention relates to a product for brewers' use and in particular aims to provide a novel commercial substance by the use of which alcoholic beverages of the character of beers and ales may be conveniently and cheaply produced.

By the use of the product which I am about to describe, alcoholic beverages may be prepared in accordance with the method described in my Patent 1,214,518 or by methods similar thereto in a most economical manner. The present invention is closely related to that described in the patent referred to.

In accordance with my present invention I provide a substance which may be made on a large scale at a central plant and supplied to brewers who may prepare beverages therefrom without themselves incurring any great expense for apparatus or skilled operators. To this end I provide a product containing in concentrated form fermentable sugars and nitrogenous matter in such proportion as to produce, when boiled with hops and fermented with yeast in the ordinary way, a beverage of the character of beer or ale. This substance is prepared by acid-conversion of starch and protein containing material by a method corresponding to certain of the steps described in my patent above referred to.

I will herein state by way of an example a suitable process which may be followed. Suitable starch and protein containing materials such as cereals, tubers or starchy fruits may be employed. I take this material in finely divided form with or without previous drying, torrefication or partial caramelization, stir, or mix, it in any convenient manner with acidulated water, preferably at a temperature about 150° F. (65.5° C.) applying further heat and boiling if necessary, preferably until the material acquires a thin gelatinous consistency, familiarly known as "starch paste." I then transfer this by pumping, or otherwise, into a converter, so-called, and heat under steam pressure at any temperature, such for example as 152° C., for any length of time required until the desired degree of conversion is attained. If desired, the preliminary mixing with hot acidulated water, stirring and further heating may be carried on in the converter under atmospheric pressure, the converter being then closed and the contents subjected to steam pressure as indicated. If desired my process may be carried out advantageously in any efficient "continuous converter," so-called. I then check the further conversion of the starch and protein-containing material by rapidly lowering the temperature to 212° F. (100° C.) or even lower if desired, or partially neutralize the acid by well-known means, or by a combination of said methods. For a further discussion of this proceeding and for a number of examples stating varied conditions under which it may be carried on, I refer to my patent above mentioned.

By the treatment with acid as described the starch is converted into fermentable sugars and some of the protein present is also proteolyzed and more or less soluble nitrogenous substances are formed the nature of which is as yet more or less obscure.

If desired the percentage of soluble proteins may be increased at this point by treating the product at a temperature of about 40° to 65° centigrade, with a suitable proteolytic enzym, for example, pepsin, papain, bromelin, peptase, or the proteolytic enzym obtained from plasmolyzed or ruptured yeast cells. From 1 to 10 grams of enzym may be employed for each barrel of 31 gallons of liquid to be treated and the treatment may be continued for from 15 minutes to an hour. The longer the time or the more proteolytic enzym used the more soluble nitrogenous substances will be formed. It will be understood that these soluble proteid substances increase the foam keeping capacity, full bodied taste and viscosity of the beverage prepared and also the fermentability of the acid converted material, the nitrogen therein furnishing some of the nutriment of the yeast.

The liquid part of the product, whether or not treated with enzymes as described, may be partially neutralized if necessary until the acidity has a hydrogen ion concentration corresponding to that of about one tenth or two tenths of one per cent. of lactic acid dissociated in water solution. If the acid employed in the conversion process has a concentration of hydrogen ions but slightly greater than the above it would be unnecessary to treat the product with any neutralizing agent as I have found that a small percentage of the acid used enters into combination with some of the nitrogenous substances present and is thus eliminated from activity. It is most important, however, that the liquid be not entirely neutralized, but that a certain acidity such as described be maintained therein to prevent elimination therefrom of the protein substances which are held in solution by the acid.

The somewhat acid liquor resulting from the conversion process is then preferably separated from the solid matter in any suitable manner as by means of a centrifuge, by sedimentation, defecation, filtration or the like and concentrated by evaporation preferably in a vacuum pan at temperatures below 65° C. until it takes the form of a thick syrup which may solidify on cooling and may be very conveniently shipped as an article of commerce. I have found that the fine, suspended particles need not necessarily be removed, but the whole slightly turbid liquid can be concentrated, preferably in a vacuum pan, in the usual manner. This fine, suspended matter would be largely eliminated by the treatment with hops or on settling during fermentation by yeast. This material contains fermentable sugars and also proteins adapted to furnish the "extract" of the beverage and to make a suitable beverage it is necessary only to dilute it, treat it with hops and ferment it with yeast in the ordinary manner. If concentrated at a temperature of 65° C. or lower the proteolytic enzyms remain in active form in the acid converted starch and protein containing material.

The entire process of preparing the beverage may be simplified and in particular the labor of the final producer by adding the hops to the starch and protein containing material before the conversion thereof by acid. The material, in other words, may be hopped at the same time that the fermentable sugars are formed from the starch. The second boiling with hops is thus done away with, with an obvious economy. The concentrated material would in this instance require only dilution and fermentation in order to produce a beverage.

In concentrating the material by evaporation as described in order to permit it conveniently to be shipped, all or a part thereof may be caramelized in order to provide the desired odor, flavor and color to the beverage made therefrom.

I have found it convenient to add to the product a suitable yeast nutrient, such as ammonium phosphate or other ammonium salt or so called "yeast water."

I am, of course, aware that starch has been converted by means of acid hydrolysis and the products concentrated to forms ordinarily known as glucose syrup or grape sugar. However, in these cases either commercially pure starch was used or if protein containing material was made the basis of the conversion the resulting product was completely neutralized to eliminate the protein from the liquid. Such a product is of course unadaptable alone for making a beverage such as beer or ale. Malt must be used in addition. My product is sharply distinguished therefrom in that it includes nitrogenous material adapted to give color, taste and viscosity to the resulting beverage and to provide a food for the yeast in fermenting the same. No malt need be added.

My improved product may be prepared on a large scale and under carefully regulated conditions and shipped to small producers who can make a beverage therefrom expeditiously and cheaply. By proper variation of the temperature of conversion, the quantity of acid used and the time of heating, the amount of fermentable sugars formed and the consequent desired alcoholic content of the beverage to be produced can be regulated. The difficulty and expense attending the use of malt in brewing is also eliminated.

Claims:

1. As a new commercial product for use in preparing beverages of the character of beer and ale the concentrated residue after evaporation of the acidulous liquor produced by acid treatment of starch and protein containing material comprising in its composition fermentable sugars and protein.

2. The product identified in claim 1 when flavored by hops.

3. As a new commercial product for use in preparing beverages of the character of beer and ale the concentrated residue after evaporation of the acidulous liquor which is produced by acid treatment of starch and protein containing material and subsequent action of a proteolytic enzym and which thereby has a content of soluble protein greater than that of normal acid converted liquor.

4. The product as defined in claim 3 when the enzym remains therein in active form.

5. As a new product for use in preparing beverages of the character of beer and ale an acidulous liquor produced by acid treatment of starch and protein containing material and subsequent action of a proteolytic enzym, the liquor containing fermentable sugars and soluble protein the latter in quantity greater than that of normal acid converted liquor.

In testimony whereof, I have signed my name to this specification.

GEORGE DEFREN.